May 8, 1956 — A. W. GAUBATZ — 2,744,415
SERVOMOTOR
Filed Sept. 29, 1950
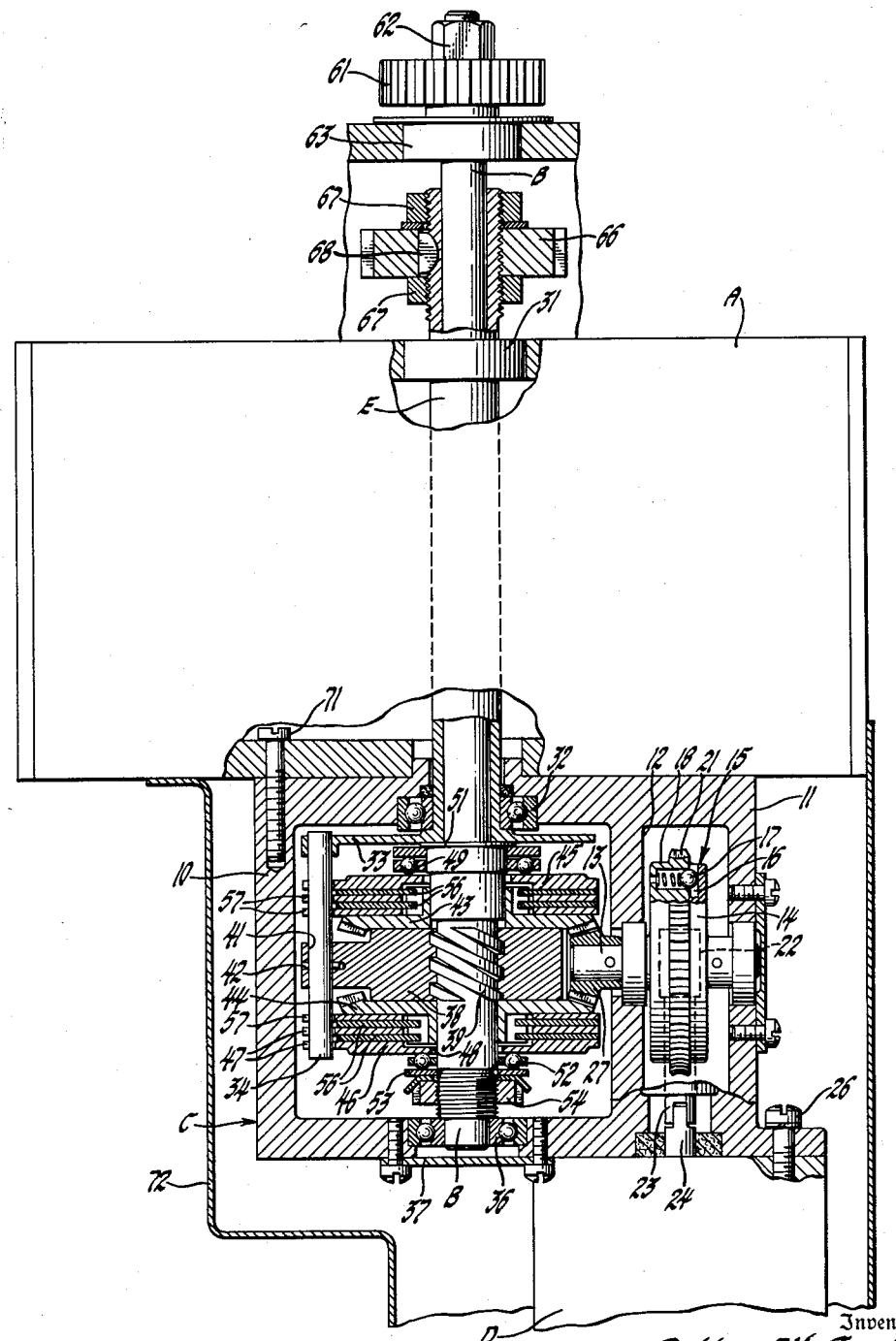
Inventor
Arthur W. Gaubatz
By Willits, Helwig & Baillio
Attorneys United States Patent Office 2,744,415
Patented May 8, 1956

2,744,415

SERVOMOTOR

Arthur W. Gaubatz, Indianapolis, Ind., assignor to General Motors Corporation, Detroit, Mich., a corporation of Delaware Application September 29, 1950, Serial No. 187,413

12 Claims. (Cl. 74—388)

This invention relates to servomotors or follow-up devices. In its preferred embodiment, the invention relates to a mechanism incorporating friction clutches which couple an output shaft to a power-driven shaft in accordance with the movement of a control shaft so that the angular movement of the output shaft duplicates that of the control shaft and the major part of the power for driving the output shaft is derived from the power-driven shaft.

I am aware that mechanisms answering to this general description have been hitherto proposed. This invention, however, has resulted in a servomechanism distinguished by simplicity, reliability, and accuracy of operation, the advantages of which will be apparent to those skilled in the art from the succeeding description thereof. The invention is particularly adapted to small installations for light duty as, for example, in control and regulating devices but may also be adapted to other uses.

The principal objects of the invention are to provide an improved servomechanism characterized by rapid, smooth, and sensitive response, by simple, compact, and light structure, and by reliability and economy; to provide a servomechanism particularly adapted for use in control or regulating systems; and to provide such a device particularly free from lost motion or oscillation.

The drawing illustrates the servomechanism of the invention in longitudinal section and the mounting thereof. The mechanism in its preferred form is adapted for mounting on a housing A which may contain devices operated by the servomotor, which are not illustrated inasmuch as the details thereof are not material to the invention. The mechanism is controlled by a control or input shaft B which transmits a signal to the servomotor indicated generally as C. A power source such as an electric motor D furnishes the energy to drive an output shaft E. This shaft follows the movements of the input shaft B and may exert considerable torque. In effect, the apparatus is a torque amplifier. The ratio of the input and output torques may be any desired value within a considerable range, the ratio being dependent upon the design constants of the mechanism.

The servomechanism is contained in a frame 10. One end wall 11 of the frame and a partition 12 support bearings for a power shaft 13 to which is fixed the driven member 14 of an overrunning clutch device 15. Member 14 is formed with notches 16 with one vertical side and one inclined side, within which are engaged balls 17 mounted in sockets in the driving clutch member 18 and urged into engagement with the driving member by springs.

A worm wheel 21 is formed integral with the driving clutch member 18, which is rotatably mounted on the shaft 13. This worm wheel is driven by a worm 22 on a shaft 23 journaled in any suitable manner in the frame. The shaft 23 is directly coupled to the shaft 24 of motor D, the motor being removably mounted on the frame 10, as by machine screws 26. A bevel pinion 27 fixed to the shaft 13 is thus driven by the motor D through the worm gearing and the overrunning clutch 15.

The hollow output shaft E is journaled in a bearing 31 in the casing A and a bearing 32 in the frame 10 and terminates in a disk or spider 33 the outer portions of which are bored to receive rods 34, preferably two in number, by which the drive is transmitted to the output shaft. The disk 33 and rods 34 comprise a cage for power transmitting clutches as will be described. The control shaft B is rotatably mounted within the tubular output shaft and the lower end of the control shaft is journaled in a bearing 36 mounted in the frame and protected by a cap 37. A traveling nut 38 is internally threaded and floats on a threaded portion 39 of the shaft B adjacent the pinion 27. The rods 34 are fitted in bores 41 in lugs projecting from the rim of the nut 38 and are secured in place by pins 42.

Two bevel gears 43 and 44 are rotatably mounted on the shaft B, one on each side of the nut 38, with the faces of the gears abutting the faces of the nut, the bevel gears meshing with the pinion 27 so as to be constantly driven in opposite directions. These bevel gears are the driving members of the friction clutches by which the motor D is coupled to the output shaft E. Each clutch comprises a backing plate indicated as 45 and 46, respectively, the edges of which are slotted as at 47 for engagement with the pins 34 and which are formed with a central opening 48 for clearance over the shaft B. The disk 45 bears against a ball thrust bearing 49 received against a flange 51 on shaft B. The disk 46 likewise bears against a thrust bearing 52 acting against a washer 53 secured by a nut 54. The hubs of the bevel gears 43 and 44 are splined to receive internally-splined clutch plates 56 which are interleaved with clutch plates 57 slotted at the outer edge to receive the pins 34. As will be apparent, the bevel gears 43 and 44 and the clutch plates 56 constitute the driving members of the friction clutches and the plates 57 and the backing plates 45 and 46 constitute the driven members of the clutches.

When the shafts B and E are in the same angular position, the nut 38 is at the midpoint of its range of axial travel and both clutches are under equal and slight axial force so that the friction or torque of the two clutches balances. There is thus no tendency to rotate the output shaft.

Assuming, for purposes of illustration, that the control shaft B is rotated so as to move the nut 38 downwardly in the figure, gear 44 is displaced downwardly, increasing the friction of the lower clutch; and concurrently the friction of the upper clutch is diminished. The lower clutch then drives the driven clutch members, rotating the rods 34 about the axis of the shaft and thereby the nut 38 and the output shaft E. The rotation of the nut brings it back to its central position, and when the motion of the output shaft equals that of the control shaft the clutches are again balanced.

The axial movement of the bevel gears 43 and 44 is of small amplitude and does not significantly affect the mesh between these gears and the driving pinion 27.

As will be apparent, the driving torque of the output shaft may be many times the torque input required to actuate the clutches. The ratio of these torques depends principally upon the pitch of the thread 39, which may be adapted to secure any desired torque amplification over a wide range, and the number and composition of the clutch plates. Normally, it is desirable that the amplification be not too large in the type of applications presently contemplated for the apparatus, since it is desirable that the input have a certain resistance or "feel." The contemplated torque multiplication ratio for an aircraft control is approximately eight to one.

Clutch 15 prevents the irreversible worm gearing 21, 22 from locking the output if the motor fails. In this case, the input shaft B can drive the output shaft E through the nut 38 and the clutches, and the shaft 13 will rotate freely by virtue of the overrunning clutch.

It will be apparent to those skilled in the art that the described embodiment of the invention is particularly advantageous in many respects and that it is especially adapted to secure the stated objects of the invention.

Since the clutches are in balanced frictional relation in the neutral position of the mechanism and shifting the nut immediately increases the torque of one clutch and decreases that of the other, there is no lost motion or idle travel of the nut before the follow-up action is initiated.

As the position of the output shaft approaches that of the control shaft after a follow-up movement, the increasing friction of the non-driving clutch provides frictional damping of the mechanism, thus inhibiting any tendency to overtravel or oscillation of the output.

The embodiment described is suitable for applications requiring a limited arc of rotation. For greater angular ranges, a modified structure would be necessary. Such a modified structure could retain some of the advantages of the invention; but, for limited rotation, the construction described is believed most suitable.

The friction of the clutches in neutral position may be adjusted by moving the nut 54 to control the clearance of the clutch plates and thus eliminate backlash or excessive friction in the neutral position.

The input to the control shaft B may be accomplished in any desired manner as, for example, by a gear 61 fixed on the input shaft and retained by a nut 62. The input shaft may be journaled in a bearing 63 mounted in a portion of the housing A if desirable.

Any suitable mechanism such, for example, as a gear 66 fixed on the output shaft E by nuts 67 and a key 68, may provide an external output. As previously pointed out, the shaft E may drive control mechanisms within the housing A, the nature of which is immaterial to the invention. The frame of the servomechanism may be secured to the casing A or other supporting device in any suitable manner as by machine screws 71. A protective casing 72 enclosing the electric motor and servomechanism may be provided if desired. It will be apparent that the input and output connections represented by the gears 61 and 66 may be located immediately adjacent the frame 10 if desired.

As will be apparent to those skilled in the art, many modifications of the invention may be made within the scope thereof, which is not to be considered as limited by the detailed description of the preferred embodiment of the invention.

I claim:

1. A servomotor comprising, in combination, an output shaft, a control shaft coaxial therewith, two friction clutches, each comprising at least one driven member and at least one driving member, the driven members being coupled to the output shaft for rotation therewith, power means for rotating the driving members of the clutches in opposite directions, and a thrust member coupled to the said shafts for rotation with one of the shafts and so as to be displaced axially of the shafts by relative rotation of the shafts, the thrust member being disposed to deliver balanced axial thrust to both clutches when the shafts are in equal angular positions and to deliver increased thrust to one clutch and decreased thrust to the other clutch when displaced by relative rotation of the shafts to unbalance the friction of the clutches and effect a follow-up movement of the output shaft.

2. A servomotor comprising, in combination, an output shaft, a control shaft coaxial therewith, two friction clutches, each comprising at least one driven member and at least one driving member, the driven members being coupled to the output shaft for rotation therewith, power means for rotating the driving members of the clutches in opposite directions, and a thrust member coupled to the said shafts for rotation with one of the shafts and so as to be displaced axially of the shafts by relative rotation of the shafts, the thrust member being disposed in engagement with driving members of both clutches to deliver balanced axial thrust to both clutches when the shafts are in equal angular positions and to deliver increased thrust to one clutch and decreased thrust to the other clutch when displaced by relative rotation of the shafts to unbalance the friction of the clutches and effect a follow-up movement of the output shaft.

3. A servomotor comprising, in combination, an output shaft, a control shaft coaxial therewith, two friction clutches, each comprising at least one driven member and at least one driving member, the driven members being coupled to the output shaft for rotation therewith, power means for rotating the driving members of the clutches in opposite directions, a thrust member coupled to the said shafts for rotation with one of the shafts and so as to be displaced axially of the shafts by relative rotation of the shafts, the thrust member being disposed to deliver balanced axial thrust to both clutches when the shafts are in equal angular positions and to deliver increased thrust to one clutch and decreased thrust to the other clutch when displaced by relative rotation of the shafts to unbalance the friction of the clutches and effect a follow-up movement of the output shaft, a cage partially enclosing the clutches and thrust member and coupling the driven clutch members and thrust member to the output shaft, the power means extending through an opening in the cage to engage the driving members of the clutches.

4. A servomechanism comprising, in combination, an output shaft, a control shaft coaxial therewith, two spaced disks coaxial with the shafts and rotatable with the output shaft, two driving members disposed between the disks coaxial with the shafts, power means for rotating the driving members in opposite directions, a friction clutch between each disk and the adjacent driving member engageable by axial movement of the driving member toward the disk, a traveling nut rotatable with the output shaft disposed between and engaging the driving members, and a screw on the control shaft in threaded engagement with the traveling nut so that rotation of the control shaft relative to the output shaft displaces the nut and a driving member axially of the shafts to actuate the corresponding clutch thereby to rotate the output shaft in accordance with the rotation of the control shaft.

5. A servomechanism comprising, in combination, an output shaft, a control shaft coaxial therewith, two spaced disks coaxial with the shafts and rotatable with the output shaft, two driving bevel gear members disposed between the disks coaxial with the shafts, power means for rotating the driving members in opposite directions including a bevel pinion meshing with the driving members, a friction clutch between each disk and the adjacent driving member engageable by axial movement of the driving member toward the disk, a traveling nut rotatable with the output shaft disposed between and engaging the driving members, and a screw on the control shaft in threaded engagement with the traveling nut so that rotation of the control shaft relative to the output shaft displaces the nut and a driving member axially of the shafts to actuate the corresponding clutch thereby to rotate the output shaft in accordance with the rotation of the control shaft.

6. A servomechanism comprising, in combination, an output shaft, a control shaft coaxial therewith, two spaced disks coaxial with the shafts and rotatable with the output shaft, two driving members disposed between the disks coaxial with the shafts, power means for rotating the driving members in opposite directions, a friction clutch between each disk and the adjacent driving member engageable by axial movement of the driving member toward the disk, a travel nut rotatable with the output shaft disposed between and engaging the driving members, a screw on the control shaft in threaded engagement with the traveling nut so that rotation of the control shaft relative to the output shaft displaces the nut and a driving member axially of the shafts to actuate the corresponding clutch thereby to rotate the output shaft in accordance with the rotation of the control shaft, and longitudinally-extending members external to the driving members coupling the friction clutches and traveling nut to the output shaft.

7. A servomechanism comprising, in combination, an output shaft, a control shaft coaxial therewith, two spaced disks coaxial with the shafts and fixed to the output shaft for rotation therewith, two driving members disposed between the disks coaxial with the shafts, power means for rotating the driving members in opposite directions, a friction clutch between each disk and the adjacent driving member engageable by axial movement of the driving member toward the disk, each clutch comprising plates rotatable with the driving member and the output shaft, respectively, a traveling nut rotatable with the output shaft disposed between and engaging the driving members, and a screw on the control shaft in threaded engagement with the traveling nut so that rotation of the control shaft relative to the output shaft displaces the nut and a driving member axially of the shafts to actuate the corresponding clutch thereby to rotate the output shaft in accordance with the rotation of the control shaft.

8. A servomechanism comprising, in combination, an output shaft, a control shaft coaxial therewith, the two driving bevel gear members coaxial with the shafts, power means including a bevel pinion meshing with the bevel gears for rotating the driving members in opposite directions, a friction clutch coupling each driving member to the output shaft engageable by movement of the driving member axially of the shaft away from the other driving member, a traveling nut rotatable with the output shaft disposed between and engaging the driving members, and a screw on the control shaft in threaded engagement with the traveling nut so that rotation of the control shaft relative to the output shaft displaces the nut and a driving member axially of the shafts to actuate the corresponding clutch thereby to rotate the output shaft in accordance with the rotation of the control shaft.

9. A servomotor comprising, in combination, an output shaft, a control shaft coaxial therewith, two friction clutches, each comprising at least one driven member and at least one driving member, the driven members being coupled to the output shaft for rotation therewith, power means for rotating the driving members of the clutches in opposite directions, a thrust member coupled to the said shafts for rotation with one of the shafts and so as to be displaced axially of the shafts by relative rotation of the shafts, the thrust member being disposed to deliver balanced axial thrust to both clutches when the shafts are in equal angular positions and to deliver increased thrust to one clutch and decreased thrust to the other clutch when displaced by relative rotation of the shafts to unbalance the friction of the clutches and effect a follow-up movement of the output shaft, and an overrunning clutch between the power means and the driving members.

10. A servomotor comprising, in combination, an output shaft, a control shaft coaxial therewith, two friction clutches, each comprising at least one driven member and at least one driving member, the driven members being coupled to the output shaft for rotation therewith, power means for rotating the driving members of the clutches in opposite directions, a thrust member coupled to the said shafts for rotation with one of the shafts and so as to be displaced axially of the shafts by relative rotation of the shafts, the thrust member being disposed to deliver balanced axial thrust to both clutches when the shafts are in equal angular positions and to deliver increased thrust to one clutch and decreased thrust to the other clutch when displaced by relative rotation of the shafts to unbalance the friction of the clutches and effect a follow-up movement of the output shaft, an irreversible gear drive between the power means and the driving members, and an overrunning clutch between the said gear drive and the driving members.

11. A servomotor comprising, in combination, a rotatable output means, a rotatable control means, the said means being rotatable about a common axis, two friction clutches, each comprising at least one driven member and at least one driving member, the driven members being coupled to the output means for rotation therewith, power means for rotating the driving members of the clutches in opposite directions, and a thrust member coupled to the said output and control means for rotation with one of the means and so as to be displaced axially of the means by relative rotation of the means, the thrust member being disposed to deliver balanced axial thrust to both clutches when the means are in equal angular positions and to deliver increased thrust to one clutch and decreased thrust to the other clutch when displaced by relative rotation of the means to unbalance the friction of the clutches and effect a follow-up movement of the output means.

12. A servomechanism comprising, in combination, a rotatable output means, a rotatable control means, the said means being rotatable about a common axis, two spaced disks coaxial with the said axis and rotatable with the output means, two driving members disposed between the disks coaxial with the said axis, power means for rotating the driving members in opposite directions, a friction clutch between each disk and the adjacent driving member engageable by axial movement of the driving member toward the disk, a traveling part rotatable with the output means disposed between and engaging the driving members, and a part on the control means in threaded engagement with the traveling part so that rotation of the control means relative to the output means displaces the traveling part and a driving member along the said axis to actuate the corresponding clutch thereby to rotate the output means in accordance with the rotation of the control means.

References Cited in the file of this patent

UNITED STATES PATENTS

| 1,763,470 | Lemon | June 10, 1930 |
| 1,838,304 | Garrard | Dec. 29, 1931 |
| 2,182,458 | Vickers | Dec. 5, 1939 |
| 2,311,010 | Vickers | Feb. 16, 1943 |
| 2,354,703 | Raines et al. | Aug. 1, 1944 |
| 2,386,402 | Lilja | Oct. 9, 1945 |
| 2,407,762 | Morkoski | Sept. 17, 1946 |
| 2,576,863 | Ten Bosch et al. | Nov. 27, 1951 |

FOREIGN PATENTS

| 312,437 | Germany | Mar. 24, 1919 |
| 377,938 | France | Sept. 19, 1907 |
| 572,934 | Great Britain | Oct. 30, 1945 |
| 883,699 | France | July 12, 1943 |